Patented Jan. 7, 1936

2,026,577

UNITED STATES PATENT OFFICE 2,026,577

FREE CUTTING ALLOYS

Walter A. Dean and Charles G. Jancura, Cleveland, Ohio, assignors to Aluminum Company of America, Pittsburgh, Pa., a corporation of Pennsylvania No Drawing. Original application September 18, 1933, Serial No. 689,889. Divided and this application May 3, 1935, Serial No. 19,628

4 Claims. (Cl. 75—1)

The invention relates to aluminum base alloys and is particularly concerned with such alloys containing copper, manganese and silicon. This application is a division of our copending application Serial No. 689,889, filed September 18, 1933. Alloys disclosed but not claimed herein are claimed in our above-mentioned application, Serial No. 689,889 and our copending applications Serial Nos. 19,629 and 19,630, filed May 3, 1935.

An extensively used alloy of this nature contains from about 3.0 per cent to about 5.5 per cent of copper, from about 0.25 per cent to about 1.5 per cent of manganese, and from about 0.25 per cent to about 2.0 per cent of silicon, the balance being commercial aluminum. This alloy can be mechanically deformed by the well known commercial processes such as rolling, forging, drawing, or extrusion. The grain is thereby refined and the physical properties considerably improved and suitable thermal treatments have been devised to enhance the improvement. The alloy has been used for many applications among which may be mentioned airplane propellers and connecting rods for internal combustion engines.

There are, however, some applications wherein the alloy might be conveniently and profitably used were it not for an inherent disadvantage which militates against its use in these applications. Mechanical cutting operations such as drilling, shaping, or lathe-cutting are successfully carried out only by using certain precautions which increase the cost of production and perhaps favor the choice of another alloy which can be machined more readily but which is in other respects, for instance in physical properties, not so desirable. When alloys are difficult to machine this disadvantage becomes evident in many cases through rapid wear of the cutting tool edge which necessitates frequent resharpening. In such cases where machining is difficult, continual lubrication is required, the machined surface is rough and irregular, and the chip has a tendency to form a continuous curl or spiral that may foul the tool or the operating parts of the machine. The desirability is immediately apparent of an alloy of good working characteristics and outstanding physical properties yet possessing favorable machining qualities so that finish machining operations may be performed economically, successfully, and may be productive of a pleasing surface appearance.

Accordingly an object of the invention is the production of an aluminum base alloy containing from about 3.0 per cent to about 5.5 per cent of copper, from about 0.25 per cent to about 1.5 per cent of manganese and from about 0.25 per cent to about 2.0 per cent of silicon which may be readily and economically subjected to cutting operations.

Our invention resides in the discovery that this object is effected by the addition of one or both of the elements lead and thallium in amount between about 0.05 per cent and 10.0 per cent of each. For the purposes of our invention these elements are substantially equivalent, their behavior in alloys of the class herein described being similar in respect to machining characteristics.

We have discovered that lead or thallium, separately or in combination, belong to a class of alloying elements which have a very favorable effect on the machining properties of aluminum-copper-silicon-manganese alloys. In this specification and the appended claims we apply the term "free machining" to the constituents lead and thallium to indicate this advantageous effect on the machining properties, as evidenced by the fact that the alloys containing lead and thallium within the disclosed range may be machined more rapidly, with less tool wear, less tool sharpening, better quality of chip, and better machined surface than similar alloys not containing the lead or thallium.

We have discovered that the simultaneous presence of lead and thallium is more advantageous than that of the same total amount of either of the elements used separately. For instance, the addition of 0.5 per cent of lead and 0.5 per cent of thallium produces a more distinct improvement in machining characteristics than the addition of 1.0 per cent lead or 1.0 per cent thallium separately. Generally speaking, the lower the copper content the greater the amount of lead and/or thallium that is required to produce a desired effect on the machinability of the alloy.

When lead and thallium within the disclosed range are added to aluminum base alloys containing from about 3.0 per cent to 5.5 per cent of copper, from about 0.25 per cent to about 1.5 per cent of manganese and from about 0.25 per cent to about 2.0 per cent of silicon, the resulting alloys may be subjected to mechanical cutting operations with considerably greater economy by reason of greater allowable cutting speed and reduced tool wear. The improvement in machining quality is further evidenced by the smallness of the chip and the smooth, pleasing surface of the machined article. In addition, articles which were formerly commercially impractical to produce can now be readily fabricated.

As a preferred alloy for the exemplification of our invention we use an aluminum base alloy containing about 4.4 per cent of copper, about 0.8 per cent of silicon and about 0.8 per cent of manganese. If lead or thallium are to be added separately to this alloy we use about 2.0 per cent of lead or thallium. If used simultaneously we prefer a total of about 1.5 per cent of combined free machining constituents. The physical properties of the aluminum-copper-silicon-manganese alloy are not greatly affected by the addition of the preferred amounts of the aforesaid free machining constituents except insofar as the machining properties are most favorably affected. The higher amounts of free machining constituents effect some decrease in physical properties but this is more than offset by an increase in the ease of machining, and of course there may be certain applications of the alloy wherein a compromise of this nature is desirable.

For certain applications we have found it desirable to add still other elements to the alloys hereinabove disclosed which contain lead and/or thallium. Such elements as bismuth and cadmium can be advantageously combined with the aforesaid free machining constituents to effect an improvement in the machining characteristics of the base alloy. From about 0.05 to 1.5 per cent of bismuth and cadmium, either separately or in combination, may be used for this purpose. The total amount of the two elements should not, according to our preferred practice, exceed about 1.5 per cent. A preferred composition that illustrates the beneficial effect of a combination of the kind here referred to is an alloy containing about 4.4 per cent of copper, 0.8 per cent of silicon, 0.8 per cent of manganese, and about 0.75 per cent each of lead and bismuth, the balance being substantially all aluminum. Another combination of elements productive of good machining quality in an aluminum base alloy of the above composition is that of about 1 per cent lead and 1.5 per cent cadmium instead of 0.75 per cent each of lead and bismuth.

The lead or thallium may most conveniently be added by introducing these constituents in solid form into a molten bath of the aluminum base alloy, since they melt at a temperature considerably below those customarily used in handling molten aluminum or its alloys in the foundry. If amounts in excess of about 1.5 per cent of the total of lead and thallium are required to be incorporated in the casting, the melt should be heated somewhat above the ordinary temperature and vigorously stirred to assure a thorough mixture of the alloying constituents. The method here referred to for adding heavy low melting point metals to aluminum is more fully described in copending application, Serial No. 689,885 now Patent No. 1,959,029, issued May 15, 1934.

The alloys herein disclosed may be subjected to the usual thermal treatments familiar to those skilled in the art for the purpose of improving or altering their physical characteristics.

The term "aluminum" used herein and in the appended claims embraces the usual impurities found in aluminum ingot of commercial grade or picked up in the course of the usual handling operations incident to ordinary melting practice.

We claim:

1. An aluminum base alloy containing from about 3.0 to about 5.5 per cent of copper, from about 0.25 to about 1.5 per cent of manganese, from about 0.25 to about 2.0 per cent of silicon, from about 0.05 to 10.0 per cent of lead, and from about 0.05 to 1.5 per cent of bismuth, the balance aluminum.

2. An aluminum base alloy containing from about 3.0 to about 5.5 per cent of copper, from about 0.25 to about 1.5 per cent of manganese, from about 0.25 to about 2.0 per cent of silicon, about 0.75 per cent of lead, and about 0.75 per cent of bismuth, the balance aluminum.

3. An aluminum base alloy containing about 4.4 per cent of copper, about 0.8 per cent of silicon, about 0.8 per cent of manganese, from about 0.05 to 10.0 per cent of lead, and from about 0.05 to 1.5 per cent of bismuth, the balance aluminum.

4. An aluminum base alloy containing about 4.4 per cent of copper, about 0.8 per cent of silicon, about 0.8 per cent of manganese, about 0.75 per cent of lead, and about 0.75 per cent of bismuth, the balance aluminum.

WALTER A. DEAN.
CHARLES G. JANCURA.